United States Patent [19]

West

[11] Patent Number: 5,004,323

[45] Date of Patent: Apr. 2, 1991

[54] EXTENDED TEMPERATURE RANGE POLYMER DISPERSED LIQUID CRYSTAL LIGHT SHUTTERS

[75] Inventor: John L. West, Monroe Falls, Ohio

[73] Assignee: Kent State University, Kent, Ohio

[21] Appl. No.: 238,551

[22] Filed: Aug. 30, 1988

[51] Int. Cl.$^5$ .............................................. G02F 1/13
[52] U.S. Cl. .................................. 350/346; 350/334; 350/350 R
[58] Field of Search ............... 350/334, 347 V, 347 R, 350/346, 350 R

[56] References Cited

U.S. PATENT DOCUMENTS

| | | | |
|---|---|---|---|
| 3,578,844 | 5/1971 | Churchill et al. | 350/351 |
| 3,585,381 | 6/1971 | Hodson et al. | 350/351 |
| 3,600,060 | 8/1971 | Churchill et al. | 350/331 R |
| 3,620,889 | 11/1971 | Baltzer | 350/351 |
| 3,697,297 | 10/1972 | Churchill et al. | 252/316 |
| 3,720,623 | 3/1973 | Cartmell et al. | 350/350 R |
| 3,795,529 | 3/1974 | Cartmell et al. | 252/316 |
| 3,816,786 | 6/1974 | Churchill et al. | 350/351 |
| 3,852,092 | 12/1974 | Patterson et al. | 350/339 R |
| 3,872,050 | 3/1975 | Benton et al. | 350/351 |
| 3,885,982 | 3/1975 | Fergason | 427/162 |
| 3,935,337 | 1/1976 | Taylor | 350/331 R |
| 3,969,264 | 7/1976 | Davis | 350/350 R |
| 4,022,706 | 5/1977 | Davis | 350/350 R |
| 4,070,912 | 1/1978 | McNaughton et al. | 428/1 |
| 4,097,776 | 6/1978 | Allinikov | 350/350 |
| 4,101,207 | 7/1978 | Taylor | 350/344 |
| 4,161,557 | 7/1979 | Suzuki et al. | 350/350 |
| 4,310,577 | 1/1982 | Davison et al. | 428/1 |
| 4,356,102 | 10/1982 | Aftergut et al. | 350/349 |
| 4,435,047 | 3/1984 | Fergason | 350/334 |
| 4,643,528 | 2/1987 | Bell, Jr. | 350/334 |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |

FOREIGN PATENT DOCUMENTS

| | | |
|---|---|---|
| 2139537 | 1/1973 | France . |
| 55-96922 | 7/1980 | Japan . |
| 1442360 | 7/1976 | United Kingdom . |

OTHER PUBLICATIONS

Craighead et al., "New Display Based on Electrically Induced Index Matching in an Inhomogeneous Medium," 40 Appl. Phys. Lett. 22 (1/82).
Drzaic, "Polymer Dispersed Nematic Liquid Crystal for Large Area Displays and Light Valves," 60 J. Appl. Phys. 2142 (9/86).

Primary Examiner—Stanley D. Miller
Assistant Examiner—Anita Pellman Gross
Attorney, Agent, or Firm—Watts, Hoffmann, Fisher & Heinke

[57] ABSTRACT

An extended temperature range polymer dispersed liquid crystal light shutter electrically switchable between a transmissive and an opaque state over a working temperature range of about −40° C. to about 100° C. The shutter includes a polymer-dispersed liquid crystalline (PDLC) material comprising a fairly highly crosslinked transparent matrix having phase-separated microdroplets of liquid crystal dispersed therein, the liquid crystal existing in a supercooled liquid crystalline state at low temperatures. Such light shutters are employed in various windows and electrooptic displays, wherever it is desirable to be able to adjust visible or transparency and regardless of temperature extremes.

22 Claims, 5 Drawing Sheets

---- 60°C  —·—·— 70°C  ——— 80°C

EXTENDED TEMPERATURE RANGE POLYMER DISPERSED LIQUID CRYSTAL LIGHT SHUTTERS

TECHNICAL FIELD

This invention relates to polymer dispersed liquid crystal light shutters and, more particularly, to extended temperature range polymer dispersed liquid crystal light shutters switchable between the transmissive state and the opaque state over a working temperature range of about −40° C. to about 100° C.

BACKGROUND OF THE INVENTION

Techniques of preparing polymer dispersed liquid crystal (PDLC) shutters or light modulating materials by phase separation, as well as the advantages offered by such techniques and the materials prepared thereby, are discussed in U.S. Pat. Nos., 4,671,618, 4,673,255, 4,685,771, and 4,688,900, the disclosures of which are hereby incorporated by reference.

PDLC materials are prepared by forming a homogenous solution of liquid crystal and matrix providing material, and thereafter phase separating so as to cause spontaneous formation of liquid crystal microdroplets dispersed in a light transmissive synthetic resin matrix. The size of the phase separated microdroplets is about that of the wavelength of light.

Electrically addressable, light modulating materials prepared by phase separation techniques and employing liquid crystals exhibiting positive dielectric anisotropy are opaque to incident light in the absence of an applied electric field (OFF-state) and are transmissive to incident light in the presence of a field (ON-state).

The operation of electrically addressable PDLC light modulating materials is due to the ability to manipulate the orientation of the liquid crystal within the microdroplets. In the OFF-state, the directors of the various microdroplets are randomly aligned within the matrix causing an overall mismatch in the indices of refraction of the birefringent liquid crystal with concomitant scattering of incident light. In the ON-state, the electrical field causes the microdroplet directors to align with the field, thereby "aligning" the ordinary index of refraction of the liquid crystal with of the matrix. Since the liquid crystal's ordinary index matches that of the matrix, incident light is transmitted.

The response time of such devices, that is, the time required for all the microdroplet directors to be switched by the applied field from random to ordered alignment (opaque to transmissive switch) and then return from ordered to random alignment (transmissive to opaque switch) depends upon how rapidly the swarms of nematic liquid crystal can respond to the external stimulus of the electric field and then relax when the field is removed.

For day-to-day applications of electrically addressable liquid crystal displays (LCD), such as television screens, alphanumeric displays as in calculators, watches and the like, all of which are operated within a fairly narrow room temperature range usually extending no more than ten degrees from about 20° C. to about 30° C., response time has not been a serious problem.

Heretofore, however, LCD's of the twist nematic kind, as are well known in the art, have been rendered inoperable at low temperatures due to unworkable switching times between the transmissive and opaque states. The operational mode of twist-type LCD's is such that at lowered temperatures, the increased viscosity of the liquid crystal effectively inhibit operation of the twist cell.

It has been discovered that certain liquid crystal light modulating materials fabricated by phase separation techniques surprisingly function at extended temperature ranges reaching downward to about −40° C. and are capable of responding quickly and efficiently at these low temperatures.

DISCLOSURE OF THE INVENTION

The invention provides an extended temperature range polymer dispersed liquid crystal (ET-PDLC) light shutter electrically switchable between the transmissive state and the opaque state over a working temperature range of about −40° C. to about 100° C. ET-PDLC materials comprise fairly highly cross-linked transparent matrices having phase-separated microdroplets of liquid crystal dispersed therein, the liquid crystal existing in a supercooled liquid crystalline state at low temperatures ET-PDLC materials are employed in various windows and electrooptic displays, wherever it is desirable to be able to adjust visible or transparency and regardless of temperature extremes.

More particularly, the invention provides a liquid crystal light modulating material comprising microdroplets of liquid crystal in a polymeric matrix. The microdroplets are of a size effective to scatter incident light in the absence of an applied field, and are responsive to an applied field to transmit incident light; the matrix is effective to maintain the microdroplets in a scattering condition in the absence of an applied field, and to maintain the microdroplets responsive to an applied field to transmit incident light from about −40° C. to 80° C.

While not wishing to be bound by any operational theory, it appears that the light modulating materials of the present invention are capable of operating in the −40° C. range for the same physical reasons that twist cells are not—increasing splay and bend constants with decreasing temperature. But where the micro-geometry of the liquid crystal light shutter is such that its operation depends on the molecules being moved into and out of a preferred location within, e.g., a spherical droplet, increasing splay and bend constants lead to increased (faster) response times which seemingly cancel out system sluggishness due to increased viscosity.

The splay and bend constants of a particular liquid crystal at a particular temperature lead to a preferred orientation, e.g. along the long axis of an ellipse. Thus, at very low temperatures when the liquid crystal microdroplet is moved away from its preferred minimum energy location in the OFF-state by the application of an external field, there is an increase in the splay and bend energy. When the external field is removed there is a restoring torque returning the liquid crystal back to the preferred minimum energy position; since the torque is a function of splay and bend energy, it is also increased at lower temperatures so as to maintain fast switching.

At higher operational temperatures, the effects of lowered viscosity result in fast switching despite the decreased splay and bend constants, so that the ET-PDLC materials of the present invention exhibit a fairly even response over a large temperature range, a surprising result in itself.

The fact that the ET-PDLC materials of the present invention do operate at lower temperatures is further surprising when it is realized that the operating temperatures are well below the freezing or liquid crystal to crystal transition temperatures. This appears to mean that the micro-geometry of the ET-PDLC aids or induces a supercooled liquid crystalline state capable of responding to an external applied field so as to scatter light in the OFF-state and transmit light in the ON-state. The same ET-PDLC materials which operate −40° C. also operate at 80° C. The materials of the present invention exhibit little or no change in response time between these extrema, nor is there a marked change in contrast between the OFF and ON states anywhere in the extended temperature range of operation.

This constancy of operational characteristics over a large temperature range is surprising, because it could be expected that at the higher temperature ranges, the microdroplets could change shape and induce operational aberrations, such as increased response or degraded contrast. It could also be expected that the various components of the liquid crystal could seek to migrate or dissolve into the matrix at elevated temperatures, thus changing indices of refraction and adversely affecting the operation of any device made therewith.

It is believed that the high degree of cross-linking of the matrix contributes two-fold to these unexpected observations. First, the highly cross-linked matrix maintains the shape of the microdroplets constant over the large temperature range. Second, the high degree of cross-linking, which takes place during fabrication and phase separation of the materials, causes a "squeezing out" of any liquid crystal components initially dissolved in the matrix-providing material so that the finished product has very little liquid crystal left dissolved in the matrix. This means that all components of the liquid crystal are phase separated into the microdroplets. This is important because it is believed that some components that might help maintain the liquid crystal in its liquid crystalline state at higher temperatures exhibit preferred solubility in the matrix. If this high temperature components were to remain in the matrix instead of separating into the microdroplets, then the liquid crystal remaining in the microdroplets would be expected to exhibit lower liquid crystalline to isotropic liquid phase transition temperatures.

The advantages of the light modulating materials of the present invention are countless. The materials provide the opportunity for outdoor display and windows with optical properties that do not vary over the range of temperatures normally encountered in any part of the world. For example, automotive and aviation use of liquid crystal windows against glare and for security have not been practical due to the high, e.g. about 600v, driving voltage required to overcome viscosity at low temperatures. This, coupled with response times on the order of one-half second or more, have discouraged the use of such materials. The present materials do not display the disadvantages and drawbacks of the prior art liquid crystal windows.

These and other features of the invention will be better understood from the following detailed description taken in conjunction with the accompanying drawings.

DETAILED DESCRIPTION OF THE DRAWING

Figure 1A:
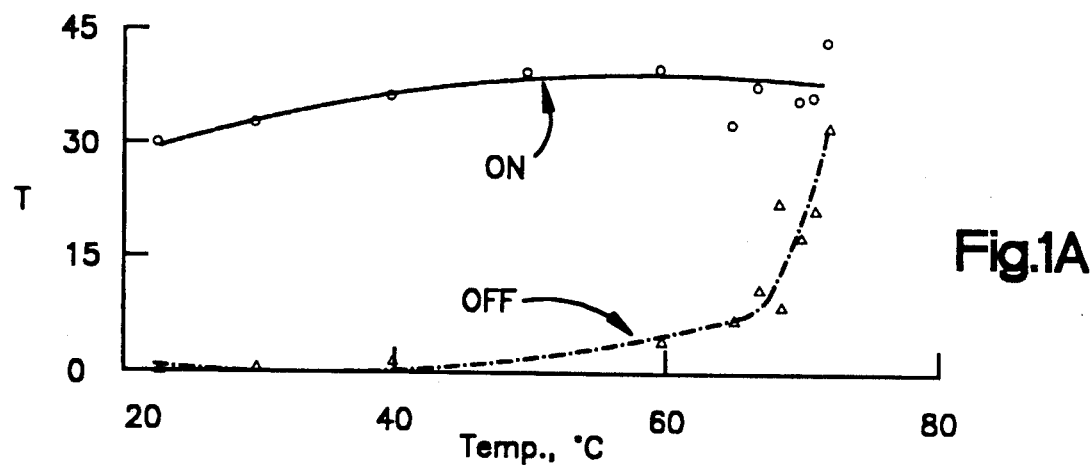
FIGS. 1A, 1B, and 1C are graphs of percent transmission versus temperature for light shutters fabricated with liquid crystals E43, E45, and E63, respectively, and cured at room temperature.
Figure 1B:
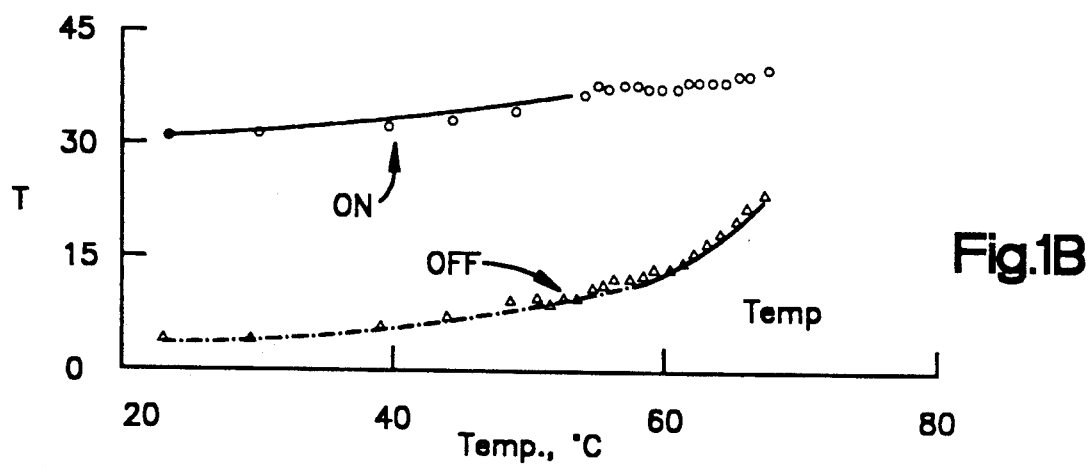
Figure 1C:
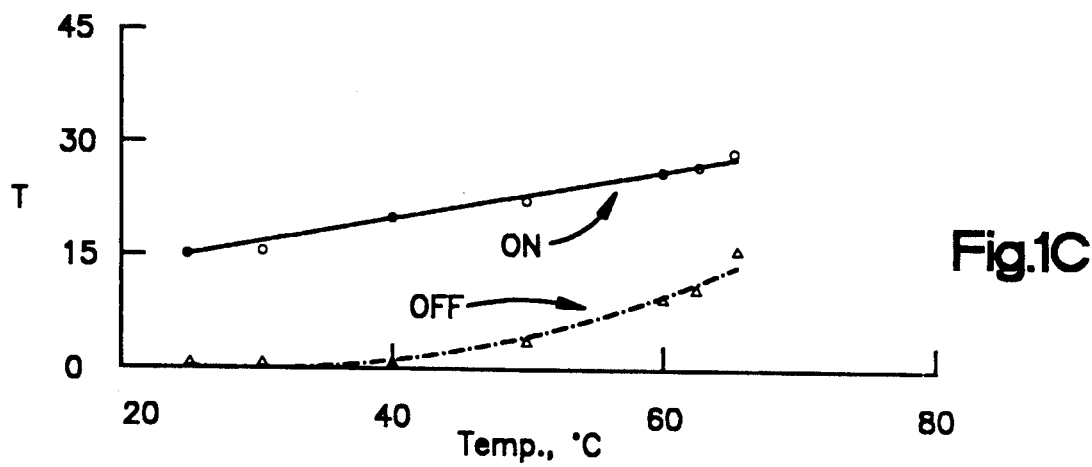

FIGS. 1A, 1B, and 1C illustrate usual transmission versus temperature graphs for PDLC materials not having an extended operational temperature range. The preparation of light modulating materials of the type referred to in FIG. 1 is described U.S. Pat. Nos., 4,671,618, 4,673,255, 4,685,771, and 4,688,900. In all cases illustrated in FIG. 1, the percent transmission for the OFF-state rises rapidly after about 60° C. as the liquid crystal approach the liquid crystalline to isotropic phase transition temperature. The phase transition temperature for E63 is marked on FIG. 1C at X, at 72° C. It can be seen that the contrast begins to degrade long before the isotropic phase transition temperature is reached.

Figure 2A:
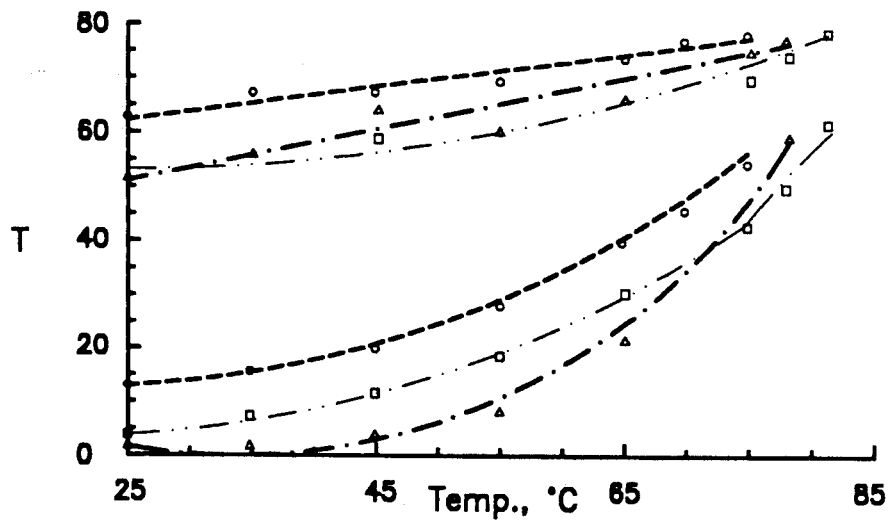
FIGS. 2A, 2B, and 2C are graphs of percent transmission versus temperature for light shutters fabricated with liquid crystals E43, E45, and E63, respectively, and cured at 60° C., 70° C., and 80° C. as indicated.
Figure 2B:
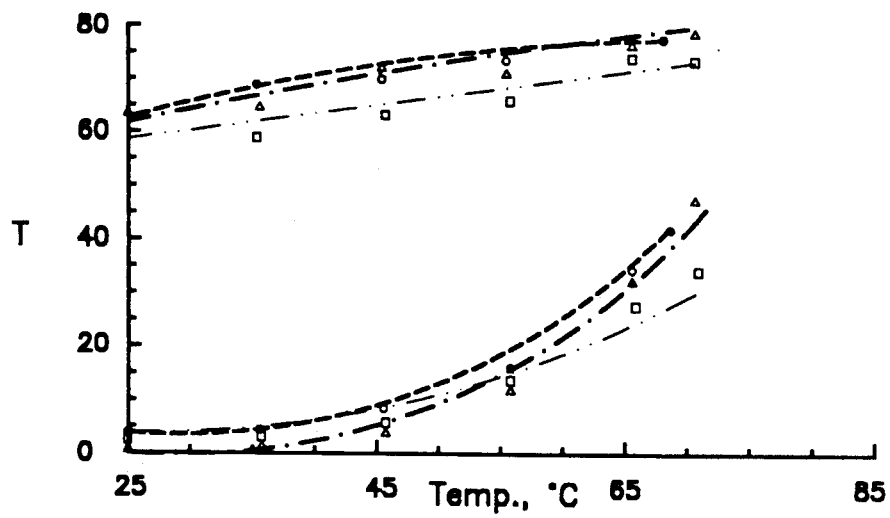
Figure 2C:
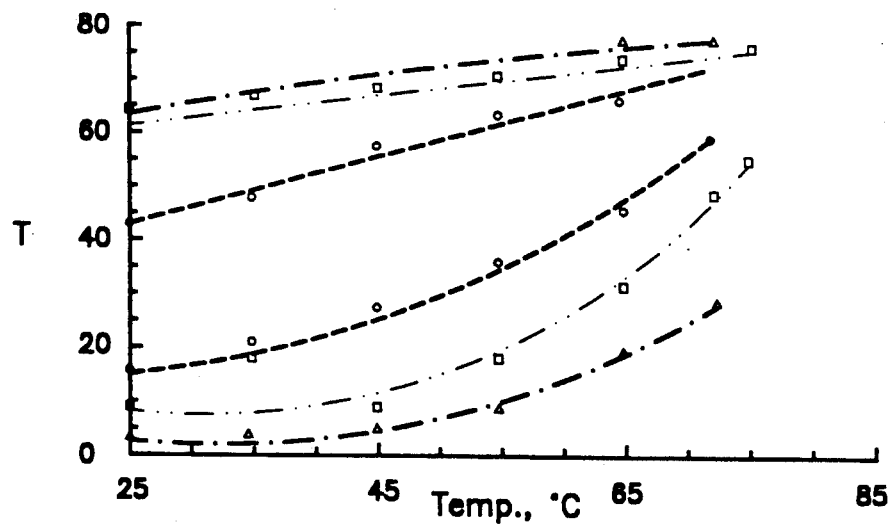

FIGS. 2A, 2B, and 2C illustrate the manner in which the composition of the matrix-providing material and the curing temperature affect the operational temperature range. The materials of FIG. 2 were prepared by mixing 1:1 Epon 828 (from Miller-Stephenson Company, Stamford, Ct.) and MK 107 (Wilmingtion Chemicals), with 30% by weight of the indicated liquid crystals, E43 (EM Chemicals), E45 (EM Chemicals), and E63 (EM Chemicals). Three shutters of each of the respective mixtures were prepared by sandwiching the mixtures between electrode-bearing glass slides spaced apart with 26 $\mu$m spacers. One of the shutters of each of the liquid crystals was cured for 12 hours at 60° C., another at 70° C., and the third at 80° C. As seen in FIGS. 2A, 2B, and 2C (and especially in comparison to FIGS. 1A, 1B, and 1C), not only is there an improvement in contrast, but the temperature range over which the shutters are operable is surprisingly extended upwardly to the vicinity of about 70° to 80° C.

Figure 3:
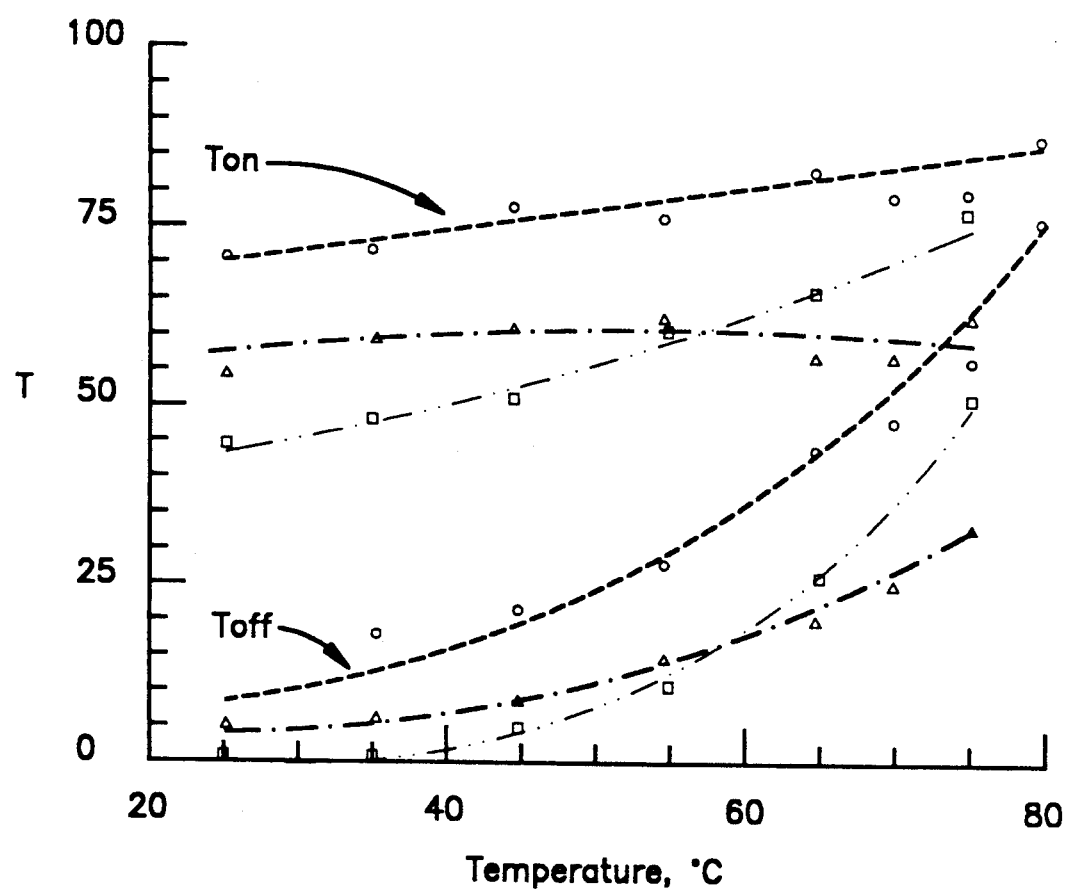
FIG. 3 is a graph of percent transmission versus temperature for light shutters fabricated with liquid crystal E43 and various epoxies as indicated.

FIG. 3 is a graph of percent transmission versus temperature for three shutters prepared with 30% by weight liquid crystal E43 and 70% by weight of a mixture of Epon 828/MK107 in the proportions indicated. Each shutter was prepared by curing the PDLC mixture between electrode bearing glass slides spaced apart at 26 $\mu$m for 12 hours at 70° C. degrees. Table I lists the relative refractive indices for the shutters of FIG. 3; $n_o$ of the liquid crystal=1.526.

TABLE I

| LINE ON FIG. 3 | $n_p$ | relationship to polymer |
|---|---|---|
| —— | 1.505 | $n_p < n_o$ |
| — — | 1.526 | $n_p = n_o$ |
| ... | 1.532 | $n_p > n_o$ |

FIG. 3 indicates that there is no clear predictable relationship between relative indices of refraction and percent transmission in either the OFF-state or the ON-state, as well as the contrast (the relative difference between the OFF- and ON- states). Notable about FIG. 3, however, is the fact that $T_{off}$ exhibits major changes not only in comparing one composition to the other, but from temperature to temperature for the same composition. Theoretically, $T_{off}$ should not be as susceptible as soon to small changes in matching or mismatching of the relative indices of refraction.

Figure 4:
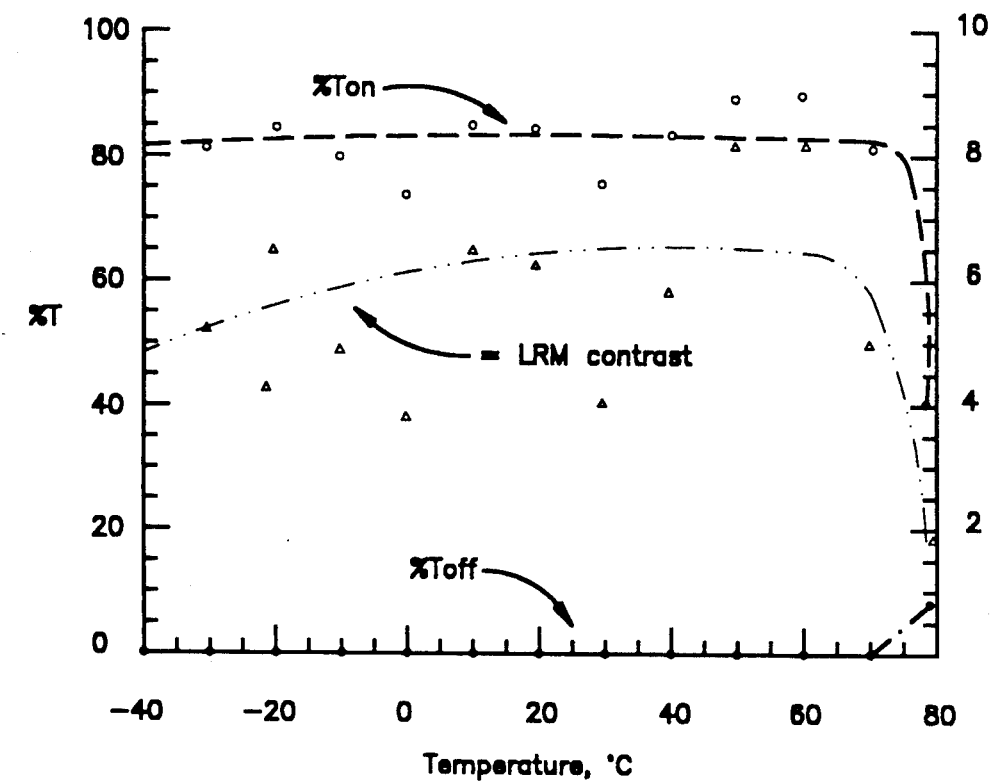
FIG. 4 is graph of percent transmission versus temperature for a light shutter fabricated with ET-PDLC material comprising E43 in EDA cured epoxy.

FIG. 4 illustrates the % $T_{on}$, the % $T_{off}$ and the "LRM" contrast as a function of temperature for a ET-PDLC light shutter fabricated by mixing 35% by weight liquid crystal E43 with 52.2% by weight WC68:6.5% by weight Epon 828, and 6.3% by weight ethylenediamine (EDA). The mixture was placed between 26 μm spaced apart electrode bearing glass slides and held at room temperature for 5 hours, then at 60° C. overnight, followed by a "postcuring" overnight period at about 90° C. (WC68 is a tradename for neo-pentyl-glycol-diglycidyl-ether available from Wilmington Chemicals, Wilmington Del.). The "LRM" contrast is calculated as follows:

$$LRM = \frac{100 - \%T_{off}}{100 - \%T_{On}}$$

The % $T_{on}$ was measured 25 milliseconds into a 100 millisecond dc pulse. The operational range of the ET-PDLC was from −40° C. to about 80° C. with a remarkable evenness to the LRM versus temperature curve. The freezing point of liquid crystal E43 is around −10° C.

Figure 5:
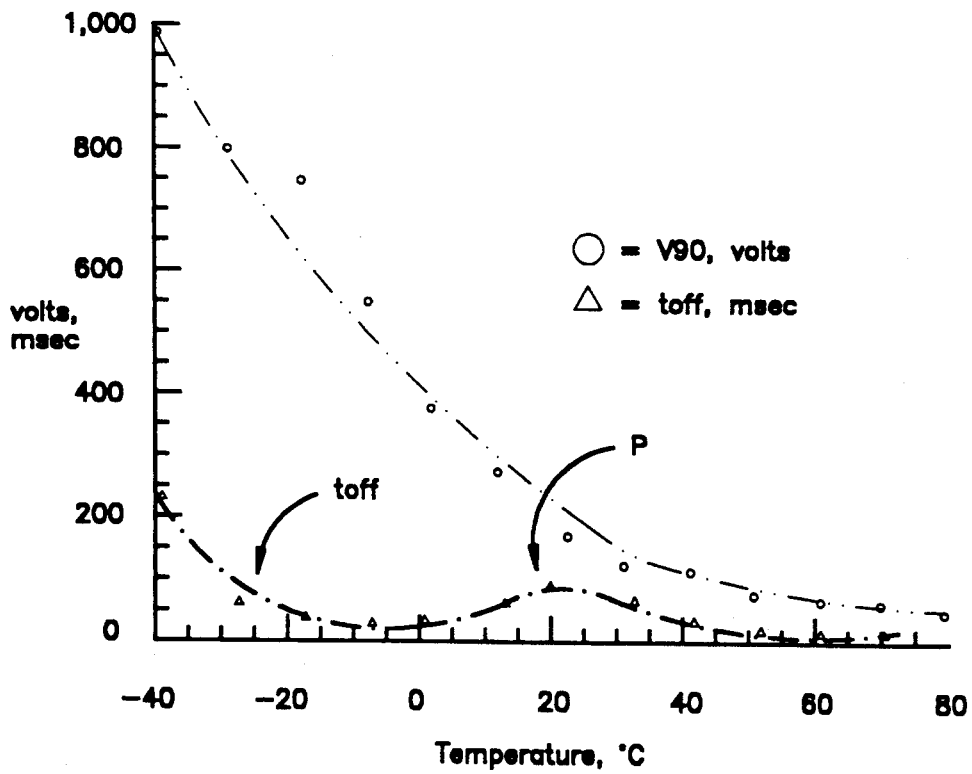
FIG. 5 is a graph of driving voltage and turn off time versus temperature for the light shutter described in FIG. 4.

FIG. 5 illustrates the driving voltage and turnoff ($T_{off}$) time as a function of temperature for the material of FIG. 4. The apparent discontinuity at P at 20° C. is a real phenomena discussed below in connection with the higher temperature range operation of the ET-PDLCs of the present invention.

Figure 6:
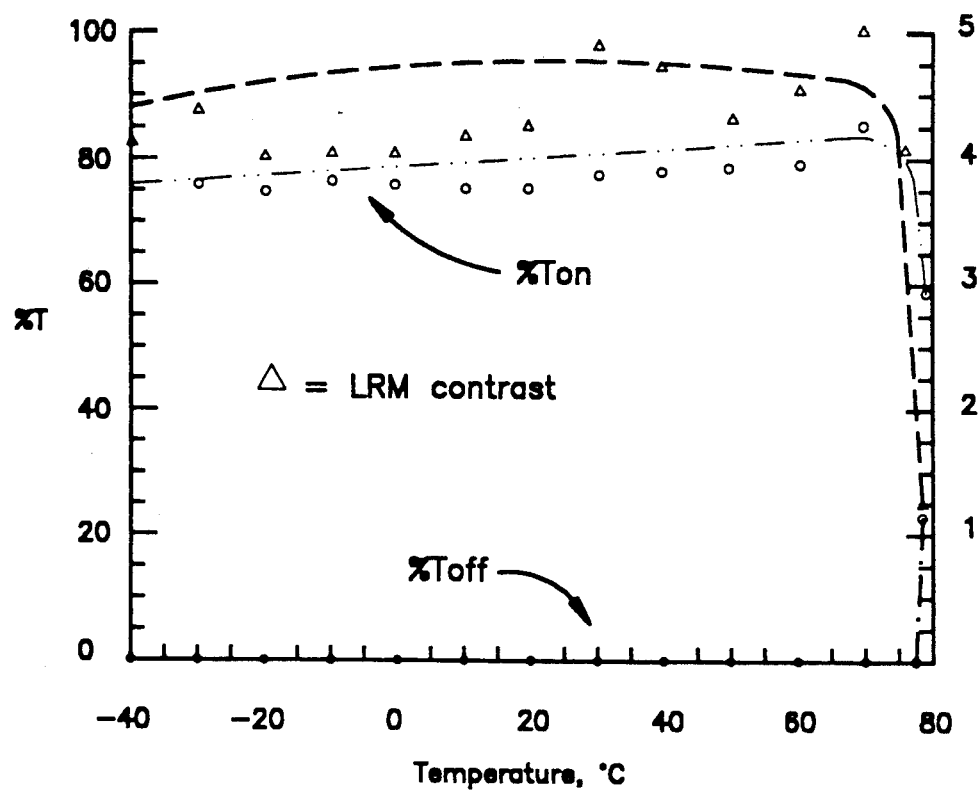
FIG. 6 is graph of percent transmission versus temperature for a light shutter fabricated with ET-PDLC material comprising E63 in EDA cured epoxy.

FIG. 6 is a graph like that shown in FIG. 4 for a ET-PDLC material prepared like that of FIG. 4 except that 35% by weight E63 was used. The LRM contrast is seen to be excellent over the entire range from below −40° C. to 80° C. The melting point of E63 is not known, but is probably quite low. E63 exhibits contrast as good as E43.

Figure 7:
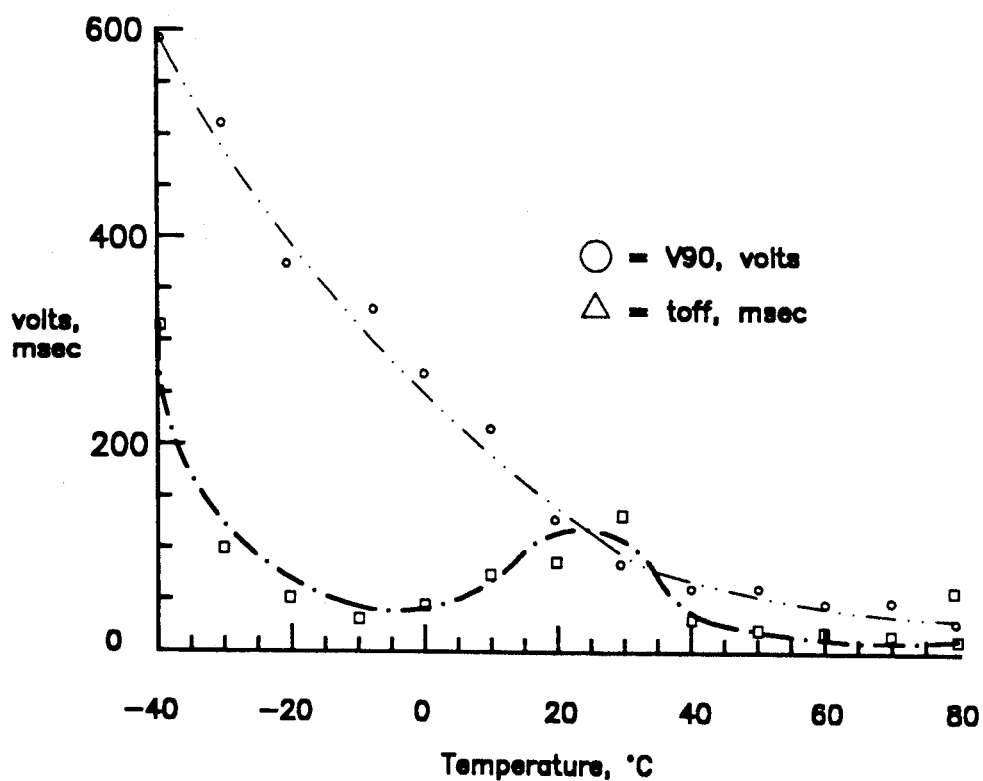
FIG. 7 is a graph of driving voltage and turn off time versus temperature for the light shutter described in FIG. 6.

FIG. 7 shows a graph of driving voltage and turn off time as a function of operating temperature; the discontinuity at P is discussed below.

While not wishing to be bound by theory, it appears that the degree of cross-linking or tightness of the matrix may account for the extended temperature range of the invention. As is known, Capcure 3-800 is a long and flexible molecule. By changing the flexibility of the binder and the tightness of the binder, the solubility of the liquid crystal within the binder is severely altered. A "tight" system allows for an increase in the phase transition temperature of the liquid crystal without inducing much change in the polymer-matrix. This appears so even above glass transition temperatures because the system is bound in a three dimensional matrix.

The matrix providing materials preferably are thermosetting; although they have glass transition temperatures wherein the chains may start moving, they never melt. At points P, noted above as discontinuities on FIGS. 5 and 7, the resistance goes down, the voltage goes up, and the visible consequence H is that the turn-off time ($T_{off}$) has a bump. Below the "bump" the driving voltage is dc; above the bump, ac.

Equivalents of the matrix providing materials of the present invention are any of the thermoset epoxy resins cured along with amine curing agents such as ethylenediamine, 1,2-diaminocyclohexane, 1,3-diaminopropane, 1,12-diaminododecane, 1,2-diaminoxyclohexane, 1,10-diaminodecane, 1,4-diaminobutane, and 1,6-diaminohexane. Contemplated equivalents of the matrix providing materials of the present invention are an of the thermoset resins with the requisite high degree of cross-linking necessary to provide for an operative light modulating material comprising microdroplets of phase-separated liquid crystal material in a light transmissive matrix and workable from about −40° C. to about 100° C.

Equivalents and contemplated equivalents of the liquid crystals of the present invention are like liquid crystals E7, E31, and E44 (all available from EM Chemicals), as well as those liquid crystals that exhibit a wide operational temperature range when incorporated into a tightly bound matrix so as to remain operational below their freezing point, if necessary, as well as to remain operational above what may be their phase transition temperature to achieve a working range between about −40° C. to about 80° C.

Variations and modifications of the invention will be apparent to those skilled in the art from the above detailed description. Therefore, it is to be understood that, within the scope of the appended claims, the invention can be practiced otherwise than as specifically shown and described.

I claim:

1. A liquid crystal light modulating material comprising a liquid crystal phase in a cross-linked polymeric matrix, the liquid crystal phase being effective to scatter incident light in the absence of an applied field, the liquid crystal phase further being responsive to an applied field to transmit incident light from about −40° C. to 80°, and the matrix being effective to maintain the liquid crystal phase in a scattering condition in the absence of an applied field.

2. The material of claim 1 wherein the matrix comprises an amine cured epoxy resin.

3. The material of claim 1 wherein the liquid crystal comprises a cyanobiphenyl.

4. The material of claim 1 wherein the matrix is effective to maintain the microdroplets responsive to an applied field to transmit incident light from about −40° C. to 100° C.

5. An extended temperature range polymer dispersed liquid crystal light shutter electrically switchable between a transmissive and an opaque state over a working temperature range of about −40° C. to about 100° C., said shutter including a polymer-dispersed liquid crystalline material comprising a highly cross-linked transparent matrix having phase-separated microdroplets of liquid crystal dispersed therein, the liquid crystal capable of existing in a supercooled liquid crystalline state at temperatures below its freezing point.

6. The shutter of claim 5 wherein the matrix comprises an amine cured epoxy resin.

7. The shutter of claim 5 wherein the liquid crystal comprises a cyanobiphenyl.

8. An extended temperature range polymer dispersed liquid crystal light shutter electrically switchable between a transmissive and an opaque state over a working temperature range of about −40° C. to about 100° C., said shutter including a polymer-dispersed liquid crystalline material comprising a highly cross-linked transparent matrix having phase-separated microdroplets of liquid crystal dispersed therein, the liquid crystal capable of existing in a liquid crystalline state at temperatures above the liquid crystalline to liquid phase transition temperature of the bulk liquid crystal.

9. The shutter of claim 8 wherein the matrix comprises an amine cured epoxy resin.

10. The shutter of claim 8 wherein the liquid crystal comprises a cyanobiphenyl.

11. A method of making an extended temperature range light modulating material comprising the step of curing a solution of liquid crystal in matrix providing material with a curing agent effective to tightly bind the matrix so that the resultant liquid crystal microdroplets spontaneously formed upon curing are capable of responding to an applied field to transmit incident light, and the matrix is capable of maintaining the microdroplets in a scattering condition in the absence of an applied field and the matrix further capable of maintaining the microdroplets responsive to an applied field to transmit incident light from about −40° C. to 80° C.

12. The method of claim 11 wherein the step of curing the solution of liquid crystal in matrix providing material includes heating the solution to a temperature no lower than 60° C. while the matrix providing material is curing.

13. A method of making an extended temperature range light modulating material of microdroplets of liquid crystal phase-separated in a light transmissive matrix and electrically switchable between a transmissive and an opaque state over a working temperature range of about −40° C. to about 100° C., comprising the step of curing a matrix-providing composition to provide an effective degree of cross-linking so that the phase-separated microdroplets of liquid crystal dispersed therein are maintained in a supercooled liquid crystalline state at temperatures below the liquid crystal freezing point.

14. A method of making an extended temperature range light modulating material of microdroplets of liquid crystal phase-separated in a light transmissive matrix and electrically switchable between a transmissive and an opaque state over a working temperature range of about −40° C. to about 100° C., comprising the step of curing a matrix-providing composition to provide an effective degree of cross-linking so that the phase-separated microdroplets of liquid crystal dispersed therein are capable of existing in a liquid crystalline state at temperatures above the liquid crystalline to liquid phase transition temperature of the bulk liquid crystal.

15. An extended temperature range light modulating material comprising a liquid crystal phase in a transparent polymer matrix;

said matrix being cross-linked to a degree effective to maintain the microdroplets in a condition to transmit light in the presence of an applied field and to scatter light in the absence of an applied field over a working temperature range of −40° C. to 80° C.

16. The light modulating material of claim 15 wherein the matrix comprises an amine cured epoxy resin.

17. The light modulating material of claim 15 wherein the liquid crystal phase comprises a cyanobiphenyl.

18. The light modulating material of claim 15 wherein the liquid crystal phase comprises a eutectic mixture of cyanobiphenyls.

19. An extended temperature range light modulating material comprising microdroplets of liquid crystal in a transparent polymeric matrix;

said light modulating material being switchable between transmissive and opaque states over a working temperature range of about −40° C. to 80° C.; and said matrix being cross-linked to a degree effective to maintain the microdroplets in a liquid crystalline state at a temperature above to liquid-crystalline-to-isotropic-liquid phase transition temperature of the liquid crystal in bulk.

20. The light modulating material of claim 19 wherein the matrix comprises an amine cured epoxy resin.

21. The light modulating material of claim 19 wherein the liquid crystal comprises a cyanobiphenyl.

22. The material of claim 19 wherein the liquid crystal comprises a eutectic mixture of cyanobiphenyls.

* * * * *

UNITED STATES PATENT AND TRADEMARK OFFICE
CERTIFICATE OF CORRECTION

PATENT NO. : 5,004,323
DATED : April 2, 1991
INVENTOR(S) : John L. West

It is certified that error appears in the above-identified patent and that said Letters Patent is hereby corrected as shown below:

Column 1, line 5, insert the following:

---The United States government has a paid-up license in this invention and may have the right in limited circumstances to require the patent owner to license others on reasonable terms as provided for by the terms of contract DARPA/NAVY/ONR Subgrant of N00014-90-J-1559, awarded by the Defense Advanced Research Project Agency.---

Signed and Sealed this

Second Day of February, 1999

Attest:

Attesting Officer

*Acting Commissioner of Patents and Trademarks*